(12) United States Patent
Thalamuthu et al.

(10) Patent No.: US 10,724,414 B2
(45) Date of Patent: Jul. 28, 2020

(54) DELAY BASED FEED FORWARD STRATEGY TO CONTROL PRESSURE IN A DIESEL EXHAUST FLUID DELIVERY SYSTEM

(71) Applicant: Robert Bosch GmbH, Stuttgart (DE)

(72) Inventors: Palanimuthu Thalamuthu, Novi, MI (US); Oliver Wintersteller, Brighton, MI (US); George Geomy, Troy, MI (US)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 15/982,915

(22) Filed: May 17, 2018

(65) Prior Publication Data

US 2019/0353070 A1   Nov. 21, 2019

(51) Int. Cl.
*F01N 3/00* (2006.01)
*F01N 3/20* (2006.01)

(52) U.S. Cl.
CPC ........ *F01N 3/208* (2013.01); *F01N 2610/144* (2013.01); *F01N 2900/0411* (2013.01); *F01N 2900/1822* (2013.01)

(58) Field of Classification Search
CPC .............. F01N 3/208; F01N 2610/144; F01N 2900/0411; F01N 13/0097; F01N 3/105; F01N 3/035
USPC ......................................................... 60/274
See application file for complete search history.

(56) References Cited

U.S. PATENT DOCUMENTS

| | | | |
|---|---|---|---|
| 9,422,850 B2 | 8/2016 | Myer et al. | |
| 9,664,084 B2 | 5/2017 | Ge et al. | |
| 2011/0000196 A1* | 1/2011 | Kasahara | F01N 3/2066 60/286 |
| 2013/0025265 A1 | 1/2013 | Gundrum | |
| 2013/0283771 A1* | 10/2013 | Nagata | F01N 3/2066 60/282 |
| 2015/0345354 A1 | 12/2015 | Miao | |
| 2017/0101913 A1 | 4/2017 | Zapf et al. | |
| 2017/0167340 A1 | 6/2017 | Englert et al. | |
| 2018/0028974 A1* | 2/2018 | Lindahl | B01D 53/9431 |
| 2018/0274420 A1* | 9/2018 | Kleinknecht | F01N 3/208 |
| 2019/0128165 A1* | 5/2019 | Sundararajan | F01N 3/2066 |

* cited by examiner

*Primary Examiner* — Jason D Shanske
(74) *Attorney, Agent, or Firm* — Michael Best & Friedrich LLP

(57) ABSTRACT

A system for regulating pressure in a diesel exhaust fluid delivery system. The system includes a first dosing valve, a pump, a hydraulic line, and an electronic processor. The electronic processor is configured to determine a dosing demand, determine a time delay between the first dosing valve opening and the pump activating, and determine a first threshold time and a second threshold time based on the time delay. The electronic processor is also configured to activate a timer. When the timer reaches the first threshold time, the electronic processor is configured to freeze the dosing demand and activate the pump based on the dosing demand. When the timer reaches the second threshold time, the electronic processor is configured to open the first dosing valve and release the freeze on the dosing demand.

10 Claims, 5 Drawing Sheets

DELAY BASED FEED FORWARD STRATEGY TO CONTROL PRESSURE IN A DIESEL EXHAUST FLUID DELIVERY SYSTEM

BACKGROUND

The disclosure relates to emissions control systems for internal combustion engines, in particular those having exhaust treatment systems. One example relates to diesel engines and associated fluid delivery systems that spray diesel exhaust fluid (DEF) into a vehicle exhaust system. Certain examples relate to regulating the pressure in a hydraulic line included in DEF delivery system.

SUMMARY

Diesel exhaust fluid (DEF) delivery systems are included in vehicle exhaust systems and deliver DEF to exhaust produced by an engine connected to the vehicle exhaust system. Delivering DEF to exhaust allows a selective catalytic reduction (SCR) system included in the vehicle exhaust system to reduce oxides of nitrogen ($NO_x$) included in the exhaust. In order to deliver the correct amount of DEF, the DEF delivery system requires a pressure that is within a predetermined range of pressures to be maintained in a hydraulic line included in the DEF delivery system. However, there is a delay between activating a dosing valve that releases DEF from the DEF delivery system and activating a pump that adds DEF to the DEF delivery system in response to a dosing demand. The delay between activating the dosing valve and activating the pump is due to the fact that the pump takes more time to ramp up to an appropriate speed for the dosing demand than the dosing valve takes to open to the appropriate position for the dosing demand. The delayed reaction of the pump when the dosing valve opens, results in a spike in the pressure in the DEF delivery system. In addition to leading to the incorrect amount of DEF being added to the DEF delivery system, the spike causes mechanical wear to the components of the vehicle exhaust system. Among other things, a system and method for eliminating pressure spikes due to the delayed reaction time of a pump in a DEF delivery system by beginning activation of the pump before beginning activation of the dosing valve are described in the embodiments below.

Embodiments provide, among other things, a system for regulating pressure in a diesel exhaust fluid delivery system. The system includes a first dosing valve, a pump, a hydraulic line, and an electronic processor. The electronic processor is configured to determine a dosing demand, determine a time delay between the first dosing valve opening and the pump activating, and determine a first threshold time and a second threshold time based on the time delay. The electronic processor is also configured to activate a timer. When the timer reaches the first threshold time, the electronic processor is configured to freeze the dosing demand and activate the pump based on the dosing demand. When the timer reaches the second threshold time, the electronic processor is configured to open the first dosing valve and release the freeze on the dosing demand.

Another embodiment provides a method of regulating pressure in a diesel exhaust fluid delivery system. The method includes determining, with an electronic processor, a dosing demand, a time delay between a first dosing valve opening and a pump activating and, a first threshold time and a second threshold time based on the time delay. The method also includes activating a timer and when the timer reaches the first threshold time, freezing the dosing demand and activating the pump based on the dosing demand. The method includes opening the first dosing valve and releasing the freeze on the dosing demand when the timer reaches the second threshold time.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

As described above, the DEF delivery system is pressurized in order to deliver a correct amount of DEF to an exhaust system. Pressure within the DEF delivery system is preferably maintained within a predetermined range of pressures. However, there is a delay between activating a dosing valve that releases DEF from the DEF delivery system and activating a pump that adds DEF to the DEF delivery system in response to a dosing demand. The delayed reaction of the pump when the dosing valve opens, results in a spike in the pressure in the DEF delivery system. Thus, pressure fluctuations occur and in some instances those pressure fluctuations are problematic.

Figure 1:
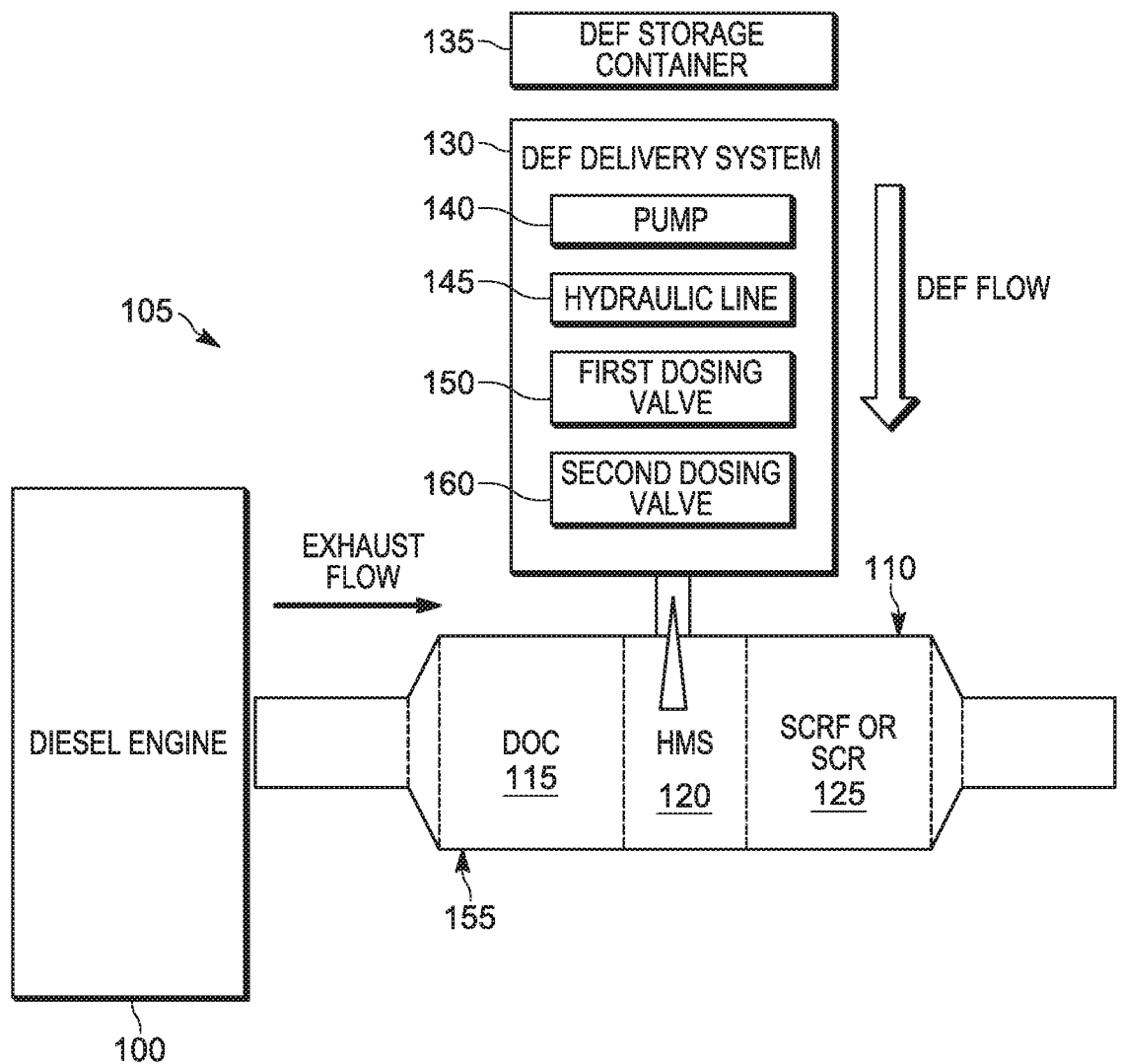
FIG. 1 is a diagram of a vehicle exhaust system that includes a DEF delivery system.

FIG. 1 illustrates a diesel engine 100 connected to an example exhaust system 105 with emissions control equipment. In the example illustrated, the exhaust system 105 includes an aftertreatment device 110 having a diesel oxidation catalyst (DOC) 115, a helix mixing section (HMS) 120, and a SCR system 125. As described above, the SCR system 125 uses a reductant, DEF, that is added to the exhaust to facilitate the chemical conversion of $NO_x$ to nitrogen ($N_2$) and water ($H_2O$). The DEF is supplied (for example, sprayed) into the exhaust system 105 upstream of the SCR system 125 by a DEF delivery system 130. In the example shown, DEF is sprayed into the HMS 120, which is positioned upstream of the SCR system 125.

In the embodiment illustrated in FIG. 1, the DEF delivery system 130 includes a pump 140 that pumps DEF from a container or receptacle that stores DEF (a DEF storage container 135) to a hydraulic line 145. DEF is held in the hydraulic line 145 until a first dosing valve 150 is opened, delivering the DEF to the exhaust system 105. In the embodiment illustrated herein the system 130 also includes a second dosing valve 160 which, when opened, delivers DEF to the exhaust system 105. As described above, it is important that the pressure in the hydraulic line 145 be within a predetermined range of pressures so that the correct amount of DEF is delivered to the exhaust system 105. The correct amount of DEF to deliver to exhaust system 105 is also called the dosing demand. The dosing demand is determined by an electronic processor (described below) based on the amount of a monitored compound, for example, an amount of NH3 sensed by a sensor (not shown) in the aftertreatment device 110. Because the amount of NH3 varies (as, for example, operation of the diesel engine 100 varies) the dosing demand also varies.

As shown in FIG. 1, the aftertreatment device 110 may be a close-coupled unit in which the HMS 120 is incorporated with at least the SCR system 125, integrated into a single common housing 155. As shown, the same housing 155 also incorporates the DOC 115 in some constructions. Within or in addition to the aftertreatment device 110, a diesel particulate filter (DPF) may also be provided. In the example shown, the aftertreatment device 110 includes only a single inlet and a single outlet for connection to upstream and downstream exhaust piping, respectively.

Figure 2:
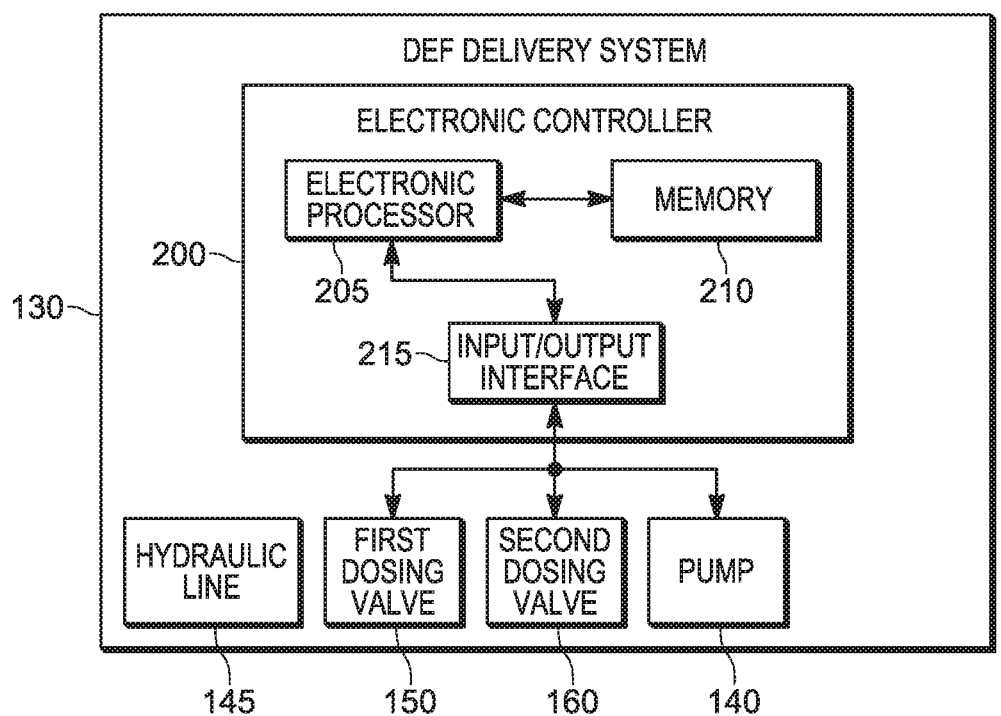
FIG. 2 is a diagram of a DEF delivery system as illustrated in FIG. 1.

FIG. 2 illustrates the DEF delivery system 130 in greater detail. As illustrated in FIG. 2 the DEF delivery system 130 includes an electronic controller 200 as well as the first dosing valve 150, second dosing valve 160, pump 140, and hydraulic line 145. It should be understood that, in some embodiments, the DEF delivery system 130 includes additional, fewer, or different components than those described herein.

The electronic controller 200 includes a plurality of electrical and electronic components that provide power, operation control, and protection to the components and modules within the electronic controller 200. The electronic controller 200 includes, among other things, an electronic processor 205 (for example, a programmable electronic microprocessor, microcontroller, or similar device), a memory 210 (for example, non-transitory, machine readable memory), and an input/output interface 215. The electronic processor 205 is communicatively connected to the memory 210 and the input/output interface 215. The electronic processor 205, in coordination with the memory 210 and the input/output interface 215, is configured to implement, among other things, the methods described herein.

The electronic controller 200 may contain sub-modules that include additional electronic processors, memory, or application specific integrated circuits (ASICs) for handling input/output functions, processing of signals, and application of the methods listed below. In other embodiments, the electronic controller 200 includes additional, fewer, or different components.

Figure 3:
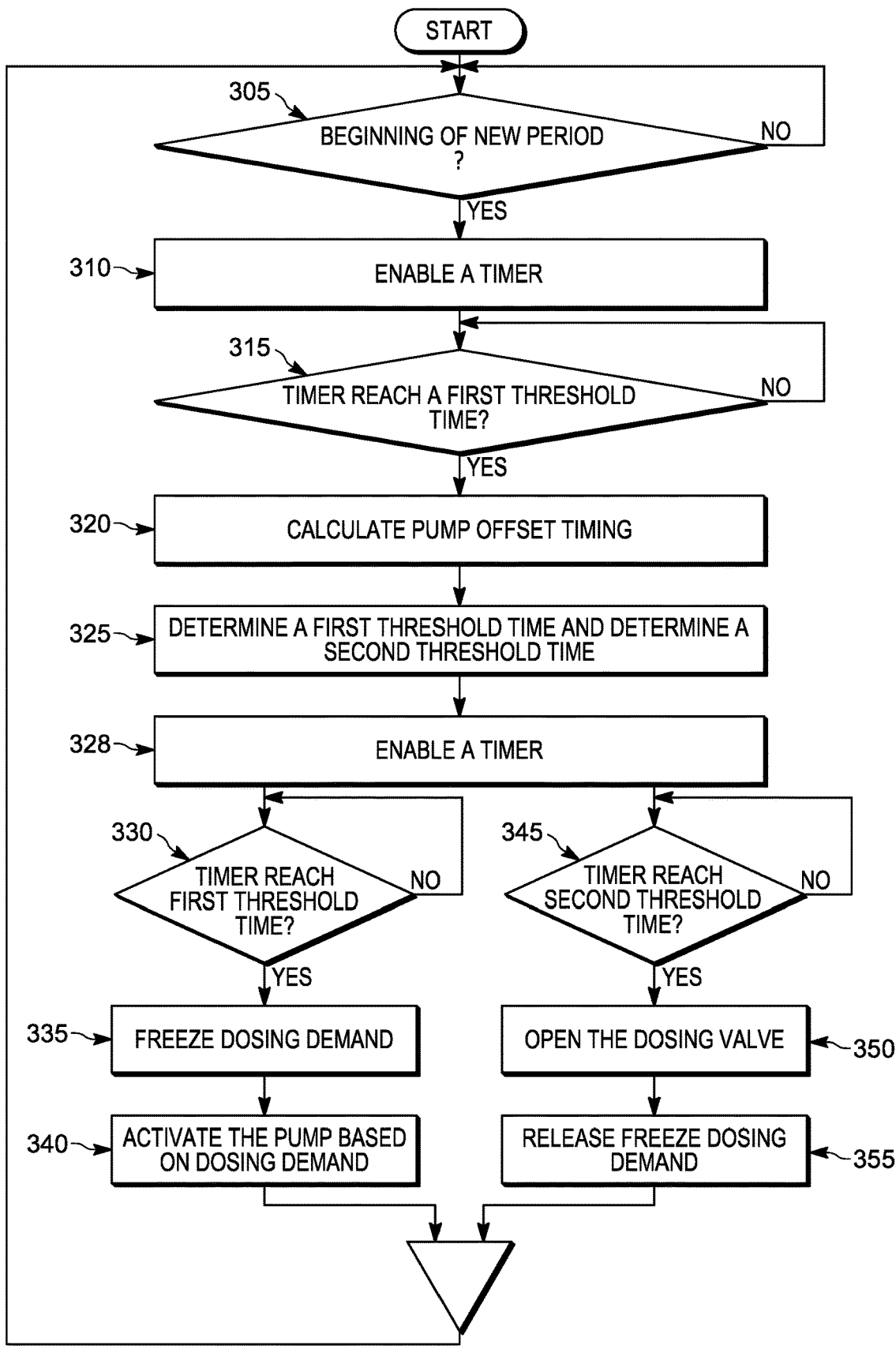
FIG. 3 is a flowchart of a method for regulating fluid pressure in a hydraulic line in a vehicle exhaust system as illustrated in FIG. 1.

FIG. 3 illustrates a flowchart for a method 300 of regulating pressure in a diesel exhaust fluid delivery system. In some embodiments, the method 300 is executed continuously at a predetermined interval or period (block 305). For example, the method 300 may be executed at a frequency of 1 Hz or every 1000 ms. Changing the interval at which the method 300 is executed changes how often the exhaust system 105 receives DEF. In every iteration of the method 300, the electronic processor 205 determines a time delay (a pump offset timing) between the first dosing valve 150 activating and the pump 140 activating in response to the dosing demand (block 320). In some embodiments, when the method 300 begins, the electronic processor 205 activates a timer or records a time indicated by a clock (block 310). When the timer reaches a threshold time (or a difference between the current time and the recorded time is greater than or equal to a first predetermined threshold) (block 315), the electronic processor 205 calculates the time delay (block 320). The electronic processor 205 determines the time delay based on an offset calibration of the pump 140 (for example, a temporal value between 160 ms and 250 ms) and the predetermined period that the method 300 is executed at. Based on the determined time delay, the electronic processor 205 determines a first threshold time and a second threshold time (block 325). The electronic processor 205 then activates a timer or records a time indicated by a clock (block 328). It should be understood that the embodiments described herein may be implemented with a single timer or clock or may be implemented with multiple timers or clocks. When the timer reaches the first threshold time (or a difference between the current time and the recorded time is greater than or equal to a first predetermined threshold) (block 330), the electronic processor 205 freezes the dosing demand (block 335) and activates the pump 140 (block 340). The dosing demand changes for reasons noted above. By freezing the dosing demand, the electronic processor 205 holds the dosing demand constant even though the amount of NH3 in the exhaust varies. When the timer reaches the second threshold time (or a difference between the current time and the recorded time is greater than or equal to a second predetermined threshold) (block 345), the electronic processor 205 opens the first dosing valve 150 (sends a signal to the first dosing valve 150 to open) (block 350) and releases the freeze on the dosing demand (block 355). In other words, once the pump 140 is activated and the dosing demand is met, the electronic processor 205 may determine a new dosing demand. It should be noted that, in the method 300 described herein, the time that elapses between receiving a dosing demand and activating the first dosing valve 150 to fulfill the dosing demand will not exceed a predetermined threshold time (for example, 250 ms). When the dosing demand is met the method 300 repeats and a new period begins.

In some embodiments, the method 300 described herein may be used to maintain the pressure in a hydraulic line included in a DEF delivery system with multiple dosing valves. In systems with multiple dosing valves, there may be a different time delay between the activation of each dosing valve and the activation of the pump 140. For example, a first dosing valve in the DEF delivery system may be associated with a time delay of 100 ms and a second dosing valve may be associated with a time delay of 150 ms. If the DEF delivery system includes multiple dosing valves, the electronic processor 205 determines a pump offset timing associated with each dosing valve. In some embodiments, if the DEF delivery system includes a second dosing valve (for example, the second dosing valve 160), the electronic processor 205 determines a second time delay (a second pump offset timing) between the second dosing valve activating and the pump 140 activating. The electronic processor 205 determines the second time delay based on an offset calibration of the pump 140 and the predetermined period that the method 300 is executed at. Based on the second time delay the electronic processor 205 determines a third threshold time and a fourth threshold time. Similar to the method 300 described above, when a timer reaches the third threshold time the electronic processor 205 freezes the dosing demand and activates the pump 140. When a timer reaches the fourth threshold time the electronic processor 205 opens the second dosing valve and releases the freeze on the dosing demand.

Figure 4:
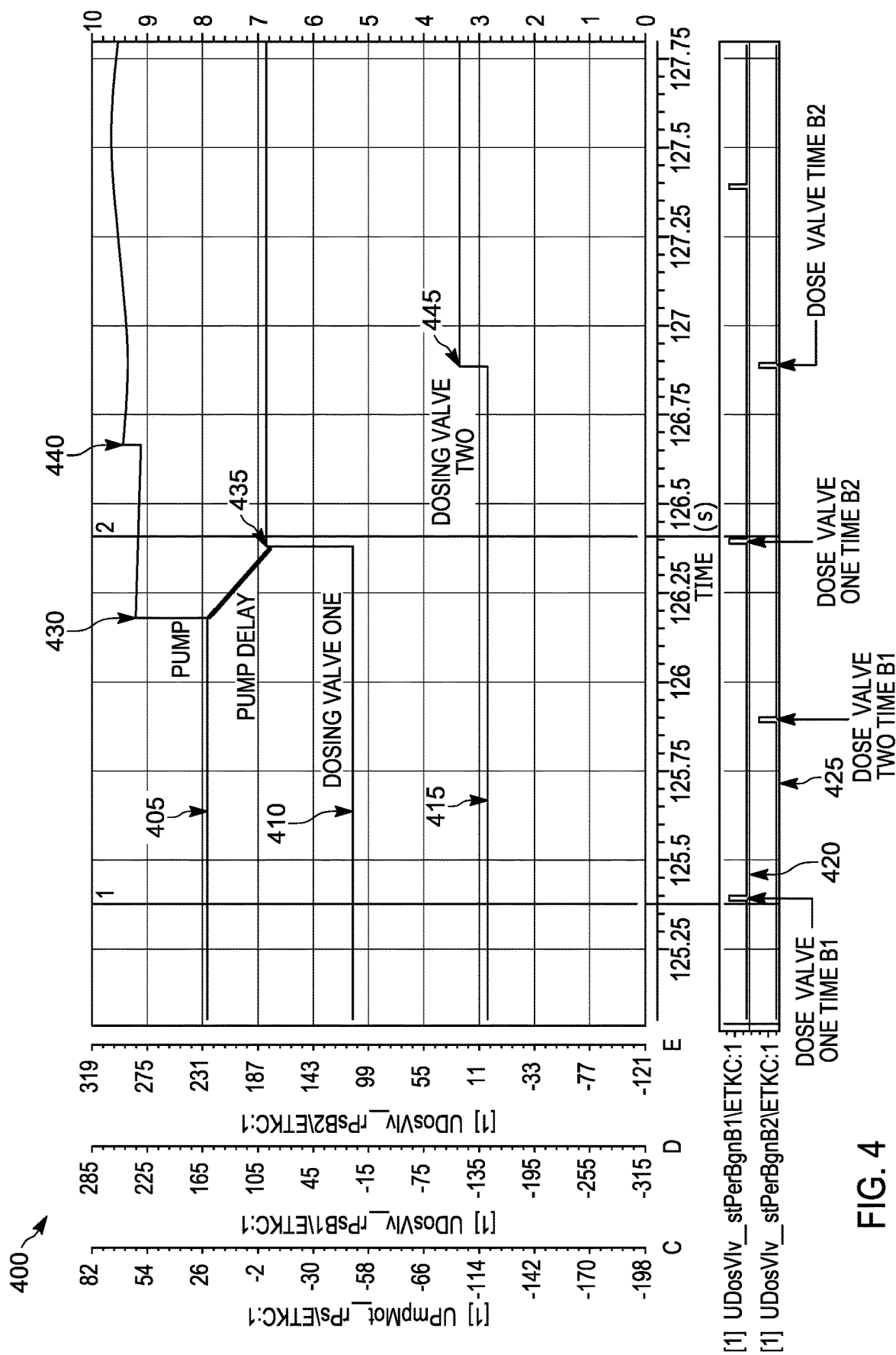
FIG. 4 is a graph illustrating an activation of a pump in relation to activation of two dosing valves.

FIG. 4 illustrates a graph 400. The graph 400 illustrates how the electronic processor 205 activates the pump 140 and dosing valves (for example, the first dosing valve 150 and the second dosing valve 160) to reduce pressure spikes. Curve 405 represents the duty cycle of the pump 140, curve 410 represents the operation of a first dosing valve (for example, the first dosing valve 150), and curve 415 represents the operation of a second dosing valve (for example, the second dosing valve 160). Clock signal 420 represents the frequency and timing of actuating the first dosing valve. Clock signal 425 represents the frequency and timing of actuating the second dosing valve. As described above, in prior systems, the pump takes more time to ramp up to an appropriate speed for the dosing demand than the dosing valve takes to open to the appropriate position for the dosing demand. Therefore, in the embodiments described herein, the pump 140 is activated at an earlier time (at point 430) than the time the first dosing valve is activated (at point 435). The pump 140 is also activated at an earlier time (at point 440) than the time the second dosing valve is activated (at point 445). It should be noted that the increase in the height of the curve 410 at point 435 (a rising edge) represents the amount that the first dosing valve is opened when the first dosing valve is activated and the increase in the height of the curve 415 at point 445 (also a rising edge) represents the amount that the second dosing valve is opened when the second dosing valve is activated.

Figure 5:
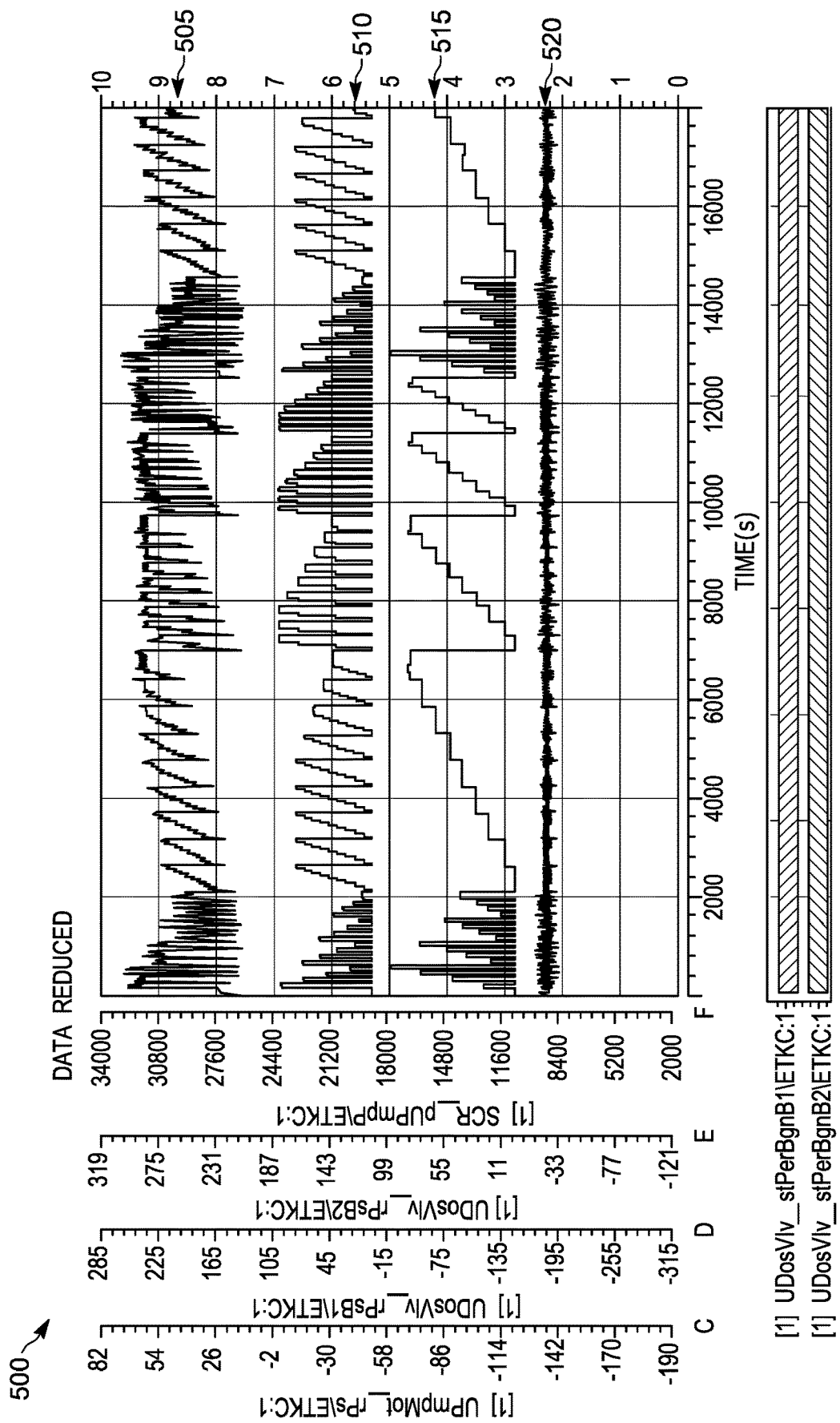
FIG. 5 illustrates duty cycles of the pump and two dosing valves of an exhaust treatment system along with pressure in the hydraulic line maintained by the system.

FIG. 5 illustrates a graph 500. Curve 505 in the graph 500 represents a duty cycle of the pump 140, curve 510 represents a duty cycle of the first dosing valve, curve 515 represents the duty cycle of the second dosing valve, and curve 520 represents the pressure in the hydraulic line 145. As illustrated by the curve 520, the pressure in the exhaust system 105 remains relatively constant despite the variations in the curve 505, curve 510, and curve 515.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, advantages, and embodiments are set forth in the following claims.

The invention claimed is:

1. A system for regulating pressure in a diesel exhaust fluid delivery system, the system comprising a first dosing valve;
   a pump;
   a hydraulic line connecting the pump and the first dosing valve; and
   an electronic processor, the electronic processor configured to:
     determine a dosing demand,
     determine a time delay between the pump achieving a rate based on the dosing demand and the first dosing valve opening to a position based on the dosing demand;
     determine a first threshold time and a second threshold time based on the time delay,
   activate a timer,
   when the timer reaches the first threshold time, freeze the dosing demand and activate the pump to add diesel exhaust fluid to the hydraulic line at the rate based on the dosing demand, and
   when the timer reaches the second threshold time, open the first dosing valve and release the freeze on the dosing demand.

2. The system according to claim 1, wherein the system further includes a second dosing valve and the electronic processor is further configured to determine a second time delay between the pump achieving the rate based on the dosing demand and the second dosing valve opening to a position based on the dosing demand,
   determine a third threshold time and a fourth threshold time based on the second time delay,
   when the timer reaches the third threshold time, freeze the dosing demand and activate the pump to add diesel exhaust fluid to the hydraulic line at the rate based on the dosing demand, and
   when the timer reaches the fourth threshold time, open the second dosing valve and release the freeze on the dosing demand.

3. The system according to claim 1, wherein the first dosing valve releases diesel exhaust fluid from the hydraulic line to an aftertreatment device.

4. The system according to claim 1, wherein the dosing demand is determined based on an amount of a monitored compound in an exhaust in an aftertreatment device.

5. The system according to claim 1, wherein the electronic processor is configured to determine the time delay between the pump achieving the rate based on the dosing demand and the first dosing valve opening to the position based on the dosing demand when the timer reaches a threshold time.

6. A method of regulating pressure in a diesel exhaust fluid delivery system, the method comprising
   determining, with an electronic processor, a dosing demand, determining, with the electronic processor, a time delay between a pump achieving a rate based on the dosing demand and a first dosing valve opening to a position based on the dosing demand;
   determining, with the electronic processor, a first threshold time and a second threshold time based on the time delay,
   activating a timer,
   when the timer reaches the first threshold time, freezing the dosing demand and activating the pump to add diesel exhaust fluid to a hydraulic line connecting the pump and the first dosing valve at the rate based on the dosing demand, and
   when the timer reaches the second threshold time, opening the first dosing valve and releasing the freeze on the dosing demand.

7. The method according to claim 6, the method further comprising
   determining a second time delay between the pump achieving the rate based on the dosing demand and a second dosing valve opening to a position based on the dosing demand,
   determining a third threshold time and a fourth threshold time based on the second time delay,
   when the timer reaches the third threshold time, freeze the dosing demand and activate the pump based on the dosing demand, and
   when the timer reaches the fourth threshold time, open the second dosing valve and release the freeze on the dosing demand.

8. The method according to claim 6, wherein the first dosing valve releases diesel exhaust fluid from the hydraulic line to an aftertreatment device.

9. The method according to claim 6, wherein determining, with an electronic processor, a dosing demand includes determining the dosing demand based on an amount of a monitored compound in an exhaust in an aftertreatment device.

10. The method according to claim 6, wherein determining, with the electronic processor, a time delay between a pump achieving a rate based on the dosing demand and a first dosing valve opening to a position based on the dosing demand includes determining the time delay between the pump achieving the rate based on the dosing demand and the first dosing valve opening to the position based on the dosing demand when the timer reaches a threshold time.

* * * * *